April 1, 1924.
J. SIMOKAITIS
1,488,559
MECHANICAL VISE
Filed July 3, 1922
2 Sheets-Sheet 1
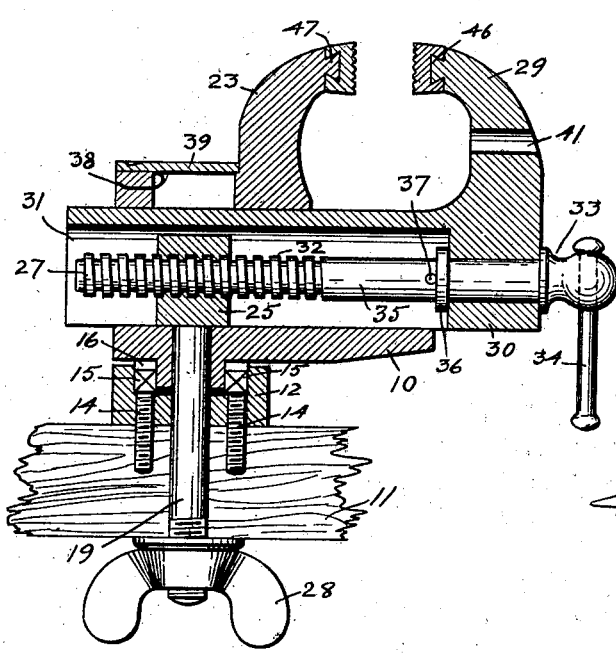
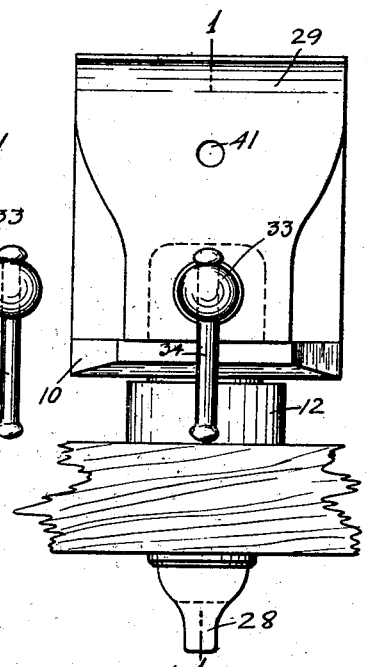
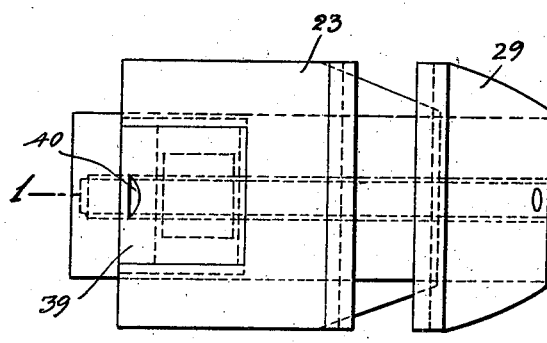
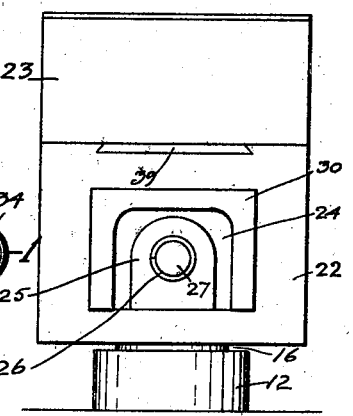
INVENTOR.
Joseph Simokaitis
BY George C. Heinicke
ATTORNEY.

April 1, 1924.
J. SIMOKAITIS
1,488,559
MECHANICAL VISE
Filed July 3, 1922    2 Sheets-Sheet 2
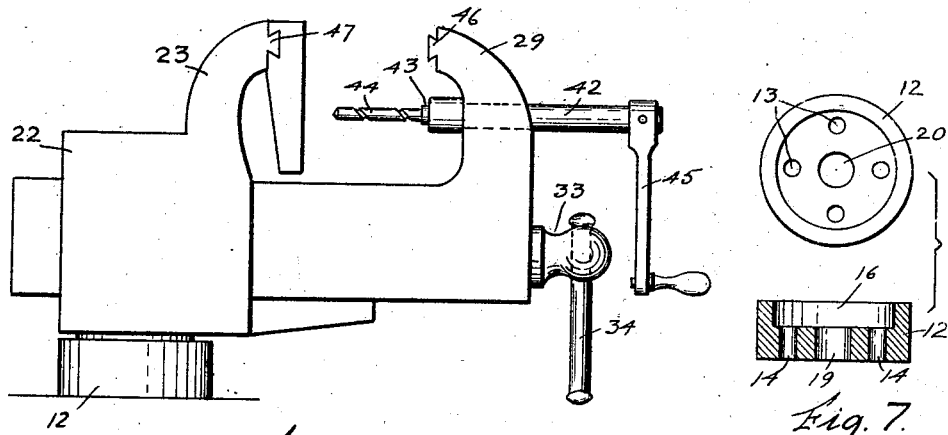
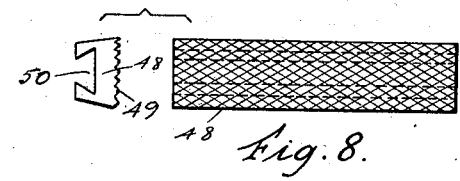
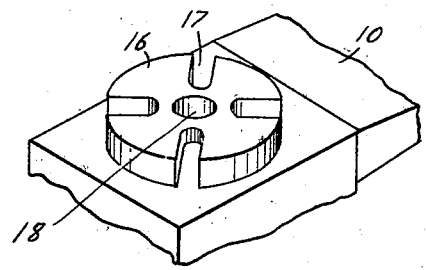
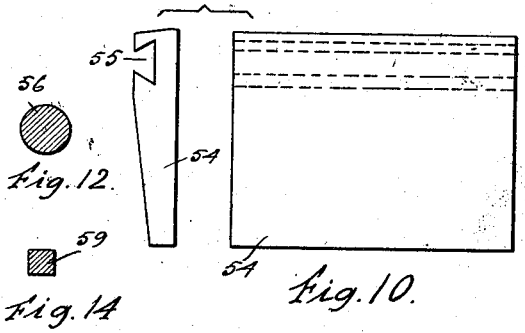
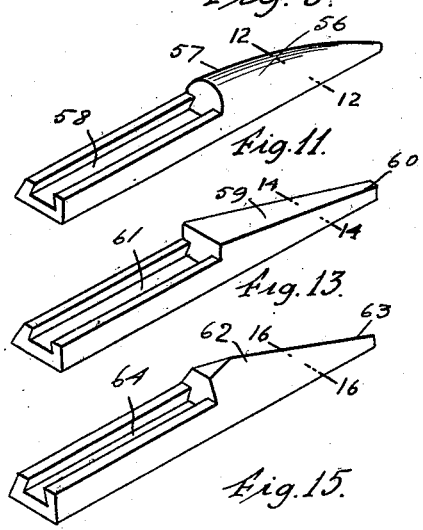
INVENTOR.
Joseph Simokaitis
BY George C. Heinrich
ATTORNEY.

Patented Apr. 1, 1924.

1,488,559

UNITED STATES PATENT OFFICE.

JOSEPH SIMOKAITIS, OF DOVER, MAINE.

MECHANICAL VISE.

Application filed July 3, 1922. Serial No. 572,410.

*To all whom it may concern:*

Be it known that I, JOSEPH SIMOKAITIS, a citizen of the United States, residing at Dover, county of Piscataquis, and State of Maine, have invented certain new and useful Improvements in Mechanical Vises, of which the following is a specification.

The present invention relates to improvements in vises and it is the principal object of the invention to provide a combination vise which may be clamped to any suitable support and which can equally well be used for a number of purposes, as for instance drilling, wire bending, to form circular rings or angular loops, clamping and pipe work.

Another object of the invention is the provision of means permitting a ready exchange of the working tools.

A further object of the invention is the provision of a novel fastening means for securing the vise to a suitable support, positively preventing any working loose of the vise.

These and other objects of my invention will become more fully known as the description thereof proceeds, and will then be specifically pointed out in the appended claim.

In the accompanying drawings forming a material part of this disclosure:

Figure 1 is a side view of a combination vise constructed according to my invention, partly in section on line 1—1, of Figure 2.

Figure 2 is an end view thereof.

Figure 3 is a top plan view.

Figure 4 is an end view seen from the end opposite to that shown in Figure 2.

Figure 5 shows the vise in side view, ready for use as a drill.

Figure 6 is a bottom plan view of part of the vise illustrating a securing member.

Figure 7 is a bottom plan and sectional view of another securing member, co-operating with the member illustrated in Figure 6.

Figure 8 shows in end and rear views a jaw attachment for clamping purposes.

Figure 9 illustrates in end and rear views a jaw attachment for clamping pipes.

Figure 10 shows in end and rear views an attachment plate to be used when the vise is employed for drilling.

Figure 11 illustrates in perspective view one of the jaw attachments to be used if the vise is employed for wire ring forming.

Figure 12 is a cross-section through the attachment, Figure 6 on line 12—12, Figure 6.

Figure 13 shows in perspective view one of the jaw attachments if the vise is to be used for forming angular wire loops.

Figure 14 is a cross-section through the attachment Figure 13, on line 14—14, Figure 13.

Figure 15 is a perspective view of one of the jaw attachments adapted to be used for forming triangular wire loops.

Figure 16 is a cross-section through the attachment illustrated in Figure 15 on line 16—16, Figure 15.

As illustrated in Figure 1, the vise 10 is secured to a table or other suitable support 11 by means of a member 12 (Figure 7) provided with openings 13 through which fastening bolts 14 are passed provided with upper heads 15, and lower threaded ends adapted to enter the material of the support or table.

The vise 10 carries at its bottom a securing element 16 (Figure 5) provided with marginal recesses 17, and a central hole 18. A fastening bolt 19 is passed through the support 11, a central opening 20 in member 12, and the central opening 18 in element 16 into the foot part 22 of the stationary jaw 23 provided with a chamber 24, where the upper end of said bolt carries a head 25 provided with an opening 26 for the passage of a spindle 27.

The lower end of the bolt 19 carries a wing nut 28 by the operation of which the vise is secured to the support 10.

The movable jaw 29 is integrally made with a body 30, the greater part of which is open at its bottom to form a chamber 31.

The inner face of the opening 26 in head 25 is provided with a worm thread, and a worm 32 on the inner end of spindle engages with said worm thread. The outer end of spindle 27 is guided through the movable jaw 29, and carries on the outside of same a perforated head 33, adapted to receive slidably an operating handle bar 34 in the usual, well known manner. The enlarged part 35 of spindle 27 carries a collar 36 close to the end wall of chamber 31.

The open upper wall 38 of the foot part 22 of the stationary jaw 23 is closed by means of a slide 39 having a notch 40 for engagement by a finger nail.

The stationary jaw 29 is provided with a bore or hole 41 for the passage of a drill spindle 42 provided at its inner end with a socket 43 for the drill 44, and carries at its outer end an operating crank 45. The inner opposing ends of the jaws 29 and 23 are dove-tailed as indicated at 46 and 47 respectively for engagement by the dove-tailed grooves of a plurality of attachments which shall now be more fully described.

If the vise is used for clamping purposes alone, a pair of attachments 48 are used, each having a straight corrugated back 49 and a dove-tailed groove 50.

If the vise is used for working on pipes, a pair of attachments 51 is used having a curved, corrugated back 52, and a dove-tailed groove 53 in its front.

For drilling purposes an attachment 54 is used comprising a plate tapering to its lower end and smooth at its rear face. This plate has a dove-tailed groove 55 near its upper end.

The following attachments are likewise used for the bending of wires:

In order to bend a wire into a circular ring, the attachment 56 is used having a tapering front end with a rounded back and a dove-tailed rear end 58. The attachment 59 is used to form wires into angular loops, it has a tapering front end 60, and a dove-tailed groove 61 and the attachment 62 is used for the formation of triangularly shaped wire loops, it has a triangular front body part 63 and a dove-tailed rear end 64.

The device operates in the following manner:

The element 12 is secured to a suitable support by means of the four screw bolts 14, entering with their heads into the recesses 17 of element 16, when the stationary jaw is placed with its foot part 22 upon the element 12.

Then the bolt 19 is introduced through chamber 24 after removal of plate 39, hole 18, and hole 20, so that the perforation 26 of its head 25 is within chamber 31 in alignment with spindle 27.

Now the body of the movable jaw is introduced through chamber 24 so that its chamber 31 will surround head 25. If now spindle 27 is screwed through head 25 by the proper manipulation of handle 34, the movable jaw can be adjusted in any desired position to the stationary jaw.

The wing nut 28 is now tightened, and will clamp the vise securely to its support.

For simple clamping operations a pair of attachment plates 48 will be engaged by means of their groove 50 with the dove-tail parts 46 and 47 of the jaws. For drilling purposes drill holder spindle 42 is introduced through hole 41 and plate 54 is attached by means of its dove-tail groove 55 to tenon 47.

For pipe work a pair of plates 51 are attached by the engagement of their dove-tail grooves 53 to the tenons of the jaws and the work pieces are held between the oppositely disposed faces 52.

For wire bending operations, the attachments 56, 59 and 62 are pairwise attached by means of their grooves 58, 61, 64 to the tenons 46 and 47 of the jaws 29 and 23 respectively.

Having thus described my invention, what I claim is—

A vise of the class described comprising a pair of jaws, dove-tail tenons on the oppositely disposed faces of said jaws, a perforated and recessed member on the bottom face of the stationary jaw, a perforated, flanged securing element adapted to be secured to a support by screws passed through its perforations and adapted to enter with their heads the recesses in said first named member, and a fastening bolt carrying a wing nut at its lower end, adapted to be passed through other perforations in said member and element respectively, a perforated head on said bolt, a spindle adapted to movably engage said head and to be operated by a handle on the outer end of said spindle for moving the movable jaw against and from said stationary jaw, said tenons allowing a ready exchange of the working attachments for drilling, clamping, wire bending and pipe operating tools engaging said jaws.

In testimony whereof I have affixed my signature.

JOSEPH SIMOKAITIS.